Reissued May 9, 1950

Re. 23,229

UNITED STATES PATENT OFFICE 23,229

COMPOUNDED LUBRICATING OIL

John R. Griffin, Jr., Bridgeport, Pa., and Paul R. Van Ess, Berkeley, Calif., assignors to Shell Development Company, San Francisco, Calif., a corporation of Delaware No Drawing. Original No. 2,410,652, dated November 5, 1946, Serial No. 591,404, May 1, 1945. Application for reissue January 21, 1950, Serial No. 139,961

15 Claims. (Cl. 252—33.4)

Matter enclosed in heavy brackets [ ] appears in the original patent but forms no part of this reissue specification; matter printed in italics indicates the additions made by reissue

This invention relates to addition agents which contribute valuable properties to lubricating oil. It also relates to improved lubricating compositions containing the herein described additives.

It is known that a substantially non-corrosive, undoped, lubricating oil generally becomes progressively corrosive under ordinary conditions of engine use. This tendency is increased or accelerated, for instance, by an elevation of temperature, by traces of dissolved copper, by degradation products formed in the oil, and by other factors. It is a common practice to add a detergent to a lubricating oil in order to assist in the removal of soot or sludge which is formed in the engine operation and thus to help keep the bearing surfaces clear. However, normally such detergents simultaneously contribute to or increase the corrosiveness of the lubricating oil. Similarly, additives employed for other purposes may also prove corrosive. This result is particularly unfortunate, if uncorrected, when it occurs in engines containing modern alloy bearings, such as those of copper-lead, cadmium-silver, cadmium-nickel, etc., since such bearings, despite their other beneficial properties, are especially susceptible to such corrosion.

The kinds of corrosion, like the causes, are complex in nature and varied in origin. For example, acids found or formed in an oil or fuel may attack copper-lead bearings to preferentially remove the lead, or aqueous acid solutions may preferentially remove the copper. Again, the effect, at high temperatures on modern bearings, of sulfur derived from certain of its compounds or even found free in the oil or fuel, may be very serious. Thus, the presence of sulfur may induce pitting of bearing surfaces, such as exhaust valve stem guides, etc., which are formed of certain alloys, e.g. copper-zinc. Also, in hot countries a crankcase temperature of 250° F.—

300° F. may occur, with the corresponding bearing temperatures going up to 325° F. or 350° F. Under these conditions sulfur can produce hard, brittle, black deposits on copper-lead or silver bearings. Such deposits may adhere and reduce the bearing clearance or they may break up and gouge out the bearing, in either event resulting in bearing failure.

The problem of engine deposits is particularly acute in aviation and similar engines, in which the high temperatures developed in the cylinders tend to act upon lubricating oils to cause the deposition of resinous and varnish-like products on the pistons and elsewhere and to produce lacquer-like coatings and carbonaceous materials, which in time tend to cause ring and valve sticking and interfere with engine operation. High piston temperatures formed especially in aviation engines promote the formation of deposits which, in turn, aggravate the situation by reducing the heat transfer. Furthermore, fuel residues from incomplete combustion of fuel contribute to the deposition of lacquer-like and carbonaceous materials in the engine. High exhaust gas temperatures foster corrosion by pitting, etc. Solution of the problem is additionally complicated by rigid government specifications for aviation lubricating oil which restrict the incorporation of any additives, such as metallic salts, which would leave a nonvolatile ash upon combustion. At the most, the total ash content should not exceed about 0.25% (determined as sulfate) and preferably should be below 0.2%.

Accordingly, it is an object of this invention to provide lubricating oil compositions which have improved properties in one or more of the following qualities: high temperature detergency, decreased piston ring sticking, wear reduction, corrosion resistance, stability in presence of copper or crankcase catalyst, oxidation stability, and the like. Another purpose is to produce a superior heavy duty lubricant particularly suitable for use in aircraft and other internal combustion engines operating at relatively high cylinder temperatures. Other objects will be apparent from the following description.

It has now been found that such lubricating problems may be overcome to a notable extent by the incorporation in a lubricating oil of two additives. The first of these additives is an oil-miscible metal salt of the condensation product of a low molecular weight aldehyde with a hydrocarbon-substituted phenol. The second additive is an aromatic amine antioxidant (as will be more fully described hereafter).

The first additive is more fully described by the following. It is initially a condensation product of a phenol with an aldehyde. The phenol must have an available ortho position, i. e. an unsubstituted position ortho to the hydroxyl radical, and also such substituent groups, preferably in the 4 or 2,4 positions, as will promote oil solubility. For example, alkyl, cycloalkyl or aryl groups, such as butyl, amyl, hexyl, heptyl, octyl, nonyl, decyl, lauryl, stearyl, oleyl, cyclohexyl, methylcyclohexyl, ethylcyclohexyl, dimethylcyclohexyl, propylcyclohexyl, trimethylcyclohexyl, dicyclohexyl, methylated dicyclohexyl, benzyl, ethylphenyl, etc., are effective. The aromatic nucleus as well as attached hydrocarbon radicals may also contain chlorine. The aromatic nucleus may be mono- or di-cyclic, resulting in such nuclei as naphthalene, tetraline, diphenyl, etc.

A lower molecular aldehyde, preferably formaldehyde or acetaldehyde, is condensed with the phenol at the ortho position by ways known to the art, for example by heating with acid or basic catalyst, whereby a resinous condensation product is obtained. Depending upon starting materials and condensation conditions, the products vary in appearance from viscous liquids to more or less brittle solids which may or may not be crystallized. A number of such resinous condensation products are commercially available, and since their methods of manufacture are generally known, further details regarding such manufacture will not be recounted here.

The phenolic resin is in turn converted to the metallic salt, for example, by treating with lime to produce the calcium salt. In general, the alkaline earth metals are preferred to form the salt, although other polyvalent metals such as Cu, Zn, Al, Pb, Fe, Ni, Co, Mn, Cr and Sn may be employed.

The resultant metal phenates may be difficultly soluble in oil. However, they may be incorporated in oil by the procedure described by Cornell in U. S. Patent 2,042,880. A simpler method which is effective for many of these salts is to dissolve them in a suitable solvent such as benzene, and then, while adding oil, gradually remove the benzene by distillation, for example, by passing an inert gas (nitrogen, natural gas, etc.) through the mixture at an elevated temperature. This generally results in a stable concentrate of the detergent salt in the lubricating oil which may then be diluted with further oil to give the desired salt concentration when needed. On the other hand, the salt may often be incorporated in a lubricating oil, without preparing an intermediate concentrate, by simply adding the desired concentration of the salt to the oil at an elevated temperature with agitation.

The amounts of the phenol-aldehyde resin salt which may be added to aviation and similar high temperature lubricating oils ordinarily must not exceed about 0.25% ash, because ash in these lubricating oils eventually accumulates in the combustion chamber of the aviation engine by leaking past the piston and piston rings, or else leaking into the super-charger (with which most aviation engines are now equipped) whence it returns with the air to the combustion chamber. About 90% of the oil lost in aviation engines is normally by way of the super-charger.

It has been stated that phenol-aldehyde resin salts act as anti-oxidants in lubricating oils. However, we found that under the high temperature conditions in aviation engines and in the amounts of ash contents of about 0.25% or less, such is not the case. Only when added in much larger amounts, i. e. of ash contents of 0.3% or higher, do these salts show anti-oxidant properties in aviation lubricants under aviation lubricating conditions.

As a result of their lack of anti-oxidant properties, aviation lubricating oils containing these salts in the permissible amounts are not only oxidation unstable, but may also be corrosive, and to overcome these detrimental effects, we add a second addition agent to lubricating oil as described below.

The second additive is an oil-soluble, relatively stable, aromatic amine anti-oxidant, free from corrosive sulfur, preferably having at least two aromatic rings, which may be condensed in one radical attached to the nitrogen atom. Especially valuable are those amines which contain at least one aromatic nucleus having two or more condensed or polycyclic aromatic rings. Thus, preferred anti-oxidants are, for example, the naphthylamines: primary, secondary or tertiary alkyl, aryl or aralkyl amines in which the alkyl, aryl or aralkyl radicals are attached to an aromatic nucleus or preferably to the nitrogen atom or both, such as phenyl-alpha or beta-naphthylamine, tetraline naphthylamine, alpha alpha, alpha beta, or beta beta dinaphthylamines, various phenanthryl, anthryl or picyl naphthylamines, xenyl naphthylamines, benzyl phenyl naphthylamines, diphenyl naphthylamines, phenyl xenyl naphthylamines, dixenyl naphthylamines; also various phenanthryl, anthryl or picyl phenyl amines, etc. The N-aryl substituted naphthylamines are in general more useful for our purpose.

If desired, however, other aryl amine anti-oxidants may be used, such as diamino diaryl alkanes, e. g., diamino diphenyl methane, tetramethyl diamino diphenyl methane, tetra methyl diamino triphenyl methane, tetra ethyl diamino triphenyl methane, diamino diphenyl ethane, diamino ditolyl ethane, etc., alkylated diaryl amines, e. g., p-ethyl diphenylamine, m-ethyl diphenylamine, p-isopropyl diphenylamine, mono- and poly- amyl, hexyl, heptyl, octyl, nonyl, decyl, hexadecyl, cyclohexyl, methyl cyclohexyl and other alkyl substituted diphenylamines, etc.

The aryl amine anti-oxidants may, in some cases, contain one or more substituents, such as hydroxyl, chloro, alkoxy, hydroxyalkyl, amino, n-alkylated amino, n-alkylated amino alkylene, etc., radicals. As illustrative of these substituted aryl amine anti-oxidants, the following may be mentioned: p-methoxy p'-isopropyl diphenyl amine, and 1,8-diamino naphthalene.

Effective amounts of the aryl amino anti-oxidants in an aviation lubricating oil are in the order of 0.1% to 0.5% by weight, although quantities of between 0.2% and 0.4% are usually sufficient. Amounts of the metallic phenate between about 0.04% and 0.2% sulfate ash are generally used, although in some cases up to about 0.25% may be employed. It will be seen that the small amounts of additives sufficient to accomplish the present purpose are much less than would be required to alter the viscosity of the lubricating composition.

It has been found that the combination of the aldehyde-phenol condensate metal salt and an aryl amine anti-oxidant in aviation lubricating oil has advantages which could not be obtained by any other combination of additives. These advantages are, in particular, non-corrosiveness, detergency at high operating temperatures (with resulting engine cleanliness and prevention of ring sticking), prevention—or at least reduction—of hard carbon formation and a hitherto unachieved reduction in wear especially of piston rings.

To appreciate these advantages, it may be well to consider a few of the difficulties which confront the producer of improved aviation lubricants. It is well known that ring sticking is one of the most frequent causes of damage to aviation engines which are lubricated by straight mineral lubricating oils. While ring sticking can be overcome to a certain extent by the use of tapered piston rings, this advantage is gained at the expense of a new difficulty, namely, ring feathering. Ring sticking in aviation engines is a high temperature detergency problem, while ring feathering is a wear problem.

Many detergents have been proposed to overcome ring sticking. However, with few exceptions they fail to function at the high temperatures of aviation engine operation, their beneficial action being restricted in most instances to lower temperatures such as occur in Diesel engines and automotive engines. It has been discovered, however, that the aldehyde-phenol condensate salts of this invention exert an unexpected detergency at high temperatures, but not at low temperatures. At the same time, these salts somewhat reduce engine wear and also cause a very pronounced softening of hard carbon normally formed.

Now as a result of the presence of a metal-containing detergent, corrosiveness of the oil increases. It has been said that anti-oxidants overcome corrosiveness induced by detergents. However, this does not always appear to be true. For example, the aldehyde-phenol condensate salts are known to exhibit anti-oxidant action at low temperature and therefore might be expected to inhibit this corrosiveness. However, this was found not to be the case when employing 0.2% (sulfate ash) of the additive. Certain other anti-oxidants do to some extent inhibit this corrosiveness, but have the disadvantage of causing at least a partial loss of the carbon softening properties. Moreover, these inhibitors, like the ordinary phenolic inhibitors, such as the 2,6-ditertiary-butyl-4-methyl-phenol, fail to have any effect on the wear properties.

The aryl amine antioxidants and especially those having condensed rings described earlier, however, have a very peculiar effect on the aviation oil in combination with the aldehyde-phenol condensate salt. Not only do they do away with the corrosiveness of the oil, but they further greatly enhance the wear reduction and in some instances further reduce hard carbon formation.

The additive effect in the matter of wear reduction in itself is believed to be unusual. As a rule, two wear reducing agents do not cooperate unless they meet certain conditions indicated below, and on the contrary merely compete for the surface, the more strongly adsorbed compound displacing the other. Therefore, in so far as wear reduction is concerned, only the "stronger" agent is active. Only where so-called "chemical polishing agents" and "wedging compounds" are combined, as shown by Beeck and Givens in their articles on "The mechanism of boundary lubrication," Proceedings of the Royal Society of London, Serial A, No. 968, vol. 177, pp. 90 to 118, December, 1940, and in the Proceedings of the special summer conference on friction and surface finish of Massachusetts Institute of Technology, Cambridge, Mass., June 5, 6 and 7, 1940, p. 112, has it been known that two or more reducing agents cooperate. However, neither of the two additives of this invention is a chemical polishing agent or a wedging compound.

Due to this strong wear-reducing effect combined with the detergency, the present oil will ameliorate high temperature difficulties whether due to ring sticking or ring feathering, so that it may be employed advantageously with either the straight or tapered type of piston ring.

In military aircraft engine service in which piston ring belt lubrication is a primary problem, this lubricating oil composition, by its reduction of ring sticking and wear, offers a unique and heretofore unobtainable solution to this problem. Various other advantages of the present lubricant may be seen from consideration of the data hereinafter recorded.

The preparation of a typical aldehyde-phenol condensate salt is illustrated by reference to the use of calcium salts of methylene bis p-iso-octylphenol. This compound was prepared by condensing phenol and diisobutylene to yield an (principally para) iso-octylphenol. This was then condensed with formaldehyde to yield the resinous condensation product containing about five molecules of iso-octylphenol per molecule of resin, but which for convenience is called methylene bis-p-iso-octylphenol. The condensate was converted to calcium salt by reaction with lime as follows: About equal weights of resin and CaO were ground together to a fine powder. Water was added and the mixture heated on a steam bath in an open vessel. A vigorous reaction took place involving hydration of CaO and formation of the phenate salt. The salt was taken up in warm benzene and filtered from excess $Ca(OH)_2$. The bulk of the benzene was removed by distillation at atmospheric pressure; the remainder of the solvent was stripped under reduced pressure. The resulting residue, a glassy amorphous solid, was then ground to a yellow-green powder. The sulfate ash values of different batches varied from about 20% to 22%.

The doped and undoped oils were tested by a test known as the Thrust bearing corrosion test (described in the National Petroleum News, September 17, 1941, pp. R-294-296), which is carried out as follows: A hardened steel disc is made to rotate for 20 hours under constant pressure against three flat copper-lead bearings. The bearing assembly rests in a steel cup filled with the oil to be tested, and the temperature of the oil is maintained at a predetermined figure by thermostatic control. The bearings are weighed before and after the test, the difference in weight representing the loss sustained during the test.

TABLE

Tests in thrust bearing corrosion machine

[Fixed conditions: Cu-Pb bearings, 20 hours duration, 125 p. s. i. Thrust, 2400 R. P. M. A refined, undoped, commercial aviation lubricating oil, 115–125 S. U. at 210° F. was employed, except where noted.]

| | Additive | Conc. of additive | Bearing weight loss in mg./cm.² at— | | | | |
|---|---|---|---|---|---|---|---|
| | | | 140° C. | 150° C. | 160° C. | 170° C. | 180° C. |
| 1 | None | | 0.3 | | 0.1 | 0.3 | 26.8 |
| 2 | Calcium salt of methylene bis p-iso-octylphenol | 0.1% S. A.[1] | 0.3 | 0.7 | 49.0 | 47.7 | |
| | | [0.1% S. A.[1]] | 0.1 | 0.6 | 17.8 | | |
| 3 | Calcium salt of methylene bis-p-iso-octylphenol | 0.05% S. A.[1] | | | | | |
| | +calcium petroleum sulfonate | 0.1% S. A.[1] | | | | 58.5 | |
| 4 | Calcium salt of methylene bis p-iso-octylphenol | 0.1% S. A | | | | | |
| | +phenyl alpha naphthylamine | 0.1% wt | | | | 24.7 | |
| 5 | Calcium salt of methylene bis p-iso-octylphenol | 0.05% S. A | | | | | 58.5 |
| | +phenyl alpha naphthylamine | 0.1% wt | | | 17.6 | 44.6 | 41.9 |
| | +calcium petroleum sulfonate | 0.1% S. A | 0.1 | 0.5 | 7.2 | 21.6 | 63.6 |
| 6 | Calcium salt of methylene bis p-iso-octylphenol | 0.05% S. A | | | | | |
| | +phenyl alpha naphthylamine | 0.5% wt | | | | 29.2 | |
| | +calcium petroleum sulfonate | 0.1% S. A | | | | | |
| 7 | Calcium salt of methylene bis p-iso-octylphenol | 0.25% S. A | | | | | |
| | +phenyl alpha naphthylamine | 0.25% wt | | | 4.7 | 15 | |
| | +calcium petroleum sulfonate | 0.05% S. A | | | | | |
| 8 | Calcium salt of methylene bis p-iso-octylphenol | 0.1% S. A | | | | | |
| | +phenyl alpha naphthylamine | 0.2% wt | 0.24 | 3.2 | 2.0 | | |
| | +calcium petroleum sulfonate | 0.05% S. A | | | | | |
| [2] 9 | Calcium salt of methylene bis p-iso-octylphenol | 0.2% S. A | 0.3 | 0.0 | 4.5 | 2.6 | |
| | | | | 0.4 | 11.0 | 13.0 | |
| | | | | | | 19.4 | |
| [2] 10 | Calcium salt of methylene bis p-iso-octylphenol | 0.3% S. A | | | 2.4 | 15.5 | |
| | | | | | 0.11 | | |
| [2] 11 | Calcium salt of methylene bis p-iso-octylphenol | 0.2% S. A | | 0.0 | 0.2 | | |
| | +calcium petroleum sulfonate | | 0.1 | 0.2 | 1.1 | | |
| | | 0.1% S. A | | 0.2 | 24.8 | | |
| [2] 12 | Calcium salt of methylene bis p-iso-octylphenol | 0.2% S. A | | | | | |
| | +calcium petroleum sulfonate | 0.1% S. A | 0.0 | 0.0 | 0.2 | 17.9 | |
| | +phenyl-alpha naphthylamine | 0.2% wt | | | | | |
| [2] 13 | Calcium salt of methylene bis p-iso-octylphenol | 0.2% S. A | | | | 1.65 | |
| | +Calcium petroleum sulfonate | 0.1% S. A | | | 0.12 | 4.16 | |
| | +phenyl-alpha naphthylamine | 0.4% wt | | | | | |

[1] Based on sulfate ash.
[2] In tests 9–13, a refined, undoped, industrial lubricating oil, S. A. E. 30 grade, was employed as the base oil.

Effectiveness of a lubricant containing the present combination of lubricating oil additives in actual engine tests as well as comparison with some other blends may be seen from the following data:

BEARING CORROSIVENESS AND USED OIL PROPERTIES

Lauson 1-cylinder liquid-cooled engine

| | | |
|---|---|---|
| Speed | R. P. M. | 1,700 |
| BMEP | p. s. i. | 55 |
| Load | H. P. (1 kw.) | 1.6 |
| Jacket temp. | °C. | 100 |
| Oil sump temp. | °C. | 140 |
| Fuel | Aviation base stock | |
| Test length | hours | 40 |

[A refined, undoped, commercial aviation lubricating oil, 115–125 S. U. at 210° F. was employed.]

| Additive | Concentration in per cent sulfate ash | Cu-Pb bearing weight loss, mg./cm.² | Oil consumption, cc./hr. | Sap. No. MgKOH, g. | Neut. No. MgKOH, g. | Isopent. ins., per cent | Chlor. ins., per cent |
|---|---|---|---|---|---|---|---|
| None | | 1.3 | | 21.1 | 0.8 | 0.01 | 0.01 |
| Calcium salt of methylene bis p-isooctylphenol | 0.10 | 23.6 | 9.1 | 32.4 | 9.3 | 0.07 | 0.02 |
| | 0.30 | 0.5 | 5.8 | 6.2 | 0.9 | 0.07 | 0.02 |
| Calcium salt of methylene bis p-isooctylphenol | 0.10 | | | | | | |
| +phenyl alpha naphthylamine | [1] 0.2 | 1.9 | 2.6 | 4.5 | 0.7 | 0.06 | 0.05 |
| +sodium petroleum sulfonate | 0.02 | | | | | | |
| Calcium salt of methylene bis p-isooctylphenol | 0.225 | | | | | | |
| +phenyl alpha naphthylamine | [1] 0.2 | 1.2 | 3.55 | 9.9 | 2.4 | 1.6 | 0.06 |
| +calcium petroleum sulfonate | 0.075 | | | | | | |

[1] Per cent by weight.

Other additives may also be present, such as blooming agents, pour-point depressants or viscosity improvers, anti-oxidants, extreme pressure agents, anti-foaming agents, etc.

In order to provide detergency for the lubricating oil when employed at low temperatures, other oil-soluble detergents may be included, such as oil-soluble salts of various bases with detergent forming acids. Such bases includes metal as well as organic bases. Metallic bases include those of the alkali metals and other metals, such Mg, Ca, Sr, Ba, Zn, Cd, Al, Sn, Cr, Ni, Co, etc. Organic bases include various nitrogen bases as primary, secondary, tertiary and quaternary amines.

Examples of detergent forming acids are the various fatty acids, of say, 10 to 30 carbon atoms, wool fat acids, paraffin wax acids (produced by oxidation of paraffin wax), chlorinated fatty acids, rosin acids, aromatic carboxylic acids including aromatic fatty acids, aromatic hydroxy fatty acids, paraffin wax benzoic acids, various alkyl salicylic acids, phthalic acid monoesters, aromatic keto acids, aromatic ether acids; diphenols as di(alkylphenol) sulfides and disulfides, methylene bis alkylphenols; sulfonic acids such as may be produced by treatment of alkyl aryl hydrocarbons or high boiling petroleum oils with sulfuric acid: sulfuric acid mono-esters; phosphoric, arsenic and antimonic acid mono- and di-esters, including mono- and diesters of the corresponding thio phosphoric, thio arsenic and thio antimonic acids; phosphonic and arsonic acids, etc.

Additional detergents are the alkaline earth phosphate di-esters, including the thiophosphate di-esters; the alkaline earth diphenolates, specifically the calcium and barium salts of diphenol mono and polysulfides.

Non-metallic detergents include compounds such as the phosphatides (e. g. lecithin), certain fatty oils as rapeseed oils, voltolized fatty or mineral oils, etc.

An excellent metallic detergent for the present purpose is the calcium salt of oil soluble petroleum sulfonic acids. This may be present advantageously in the amount of about 0.025% to 0.2% sulfate ash.

Anti-oxidants comprise several types, for example alkyl phenols such as 2,4,6-trimethylphenol, pentamethylphenol, 2,4-dimethyl-6-tertiary-butylphenol, 2,4-dimethyl-6-octylphenol, 2,6-di-tertiary-butyl-4-methylphenol, 2,4,6-tritertiary-butylphenol, etc.

Corrosion inhibitors or anti-rusting compounds may also be present, such as dicarboxylic acids of 16 and more carbon atoms; alkali metal and alkaline earth salts of sulfonic acids and fatty acids; organic compounds containing an acidic radical in close proximity to a nitrile, nitro or nitroso group (e. g. alpha cyano stearic acid).

This application is a continuation-in-part of our copending application, Serial No. 502,706, filed September 15, 1943, now U. S. Patent No. 2,375,222, issued May 8, 1945.

We claim as our invention:

1. A low ash content lubricating oil for high temperature internal combustion engines containing an oil miscible metal salt of the condensation product of an aldehyde and an aromatic hydroxy compound in amount sufficient to give high temperature detergent action, but not exceeding about 0.25%, based on sulfate ash, and an oxidation-inhibiting quantity of an oil-soluble, relatively stable aromatic amine anti-oxidant.

2. An aviation lubricating oil containing from about 0.04% to 0.25% (based on sulfate ash) of an oil miscible metal salt of the condensation product of a low molecular weight aldehyde and an aromatic hydroxy compound and from about 0.1% to 0.5% by weight of an oil-soluble, aromatic amine anti-oxidant, substantially free from sulfur and metallic radicals and containing condensed aromatic rings.

3. The composition of claim 2 wherein the metal is calcium.

4. The composition of claim 2 wherein the aldehyde is formaldehyde.

5. The composition of claim 2 wherein the aldehyde is acetaldehyde.

6. The composition of claim 2 wherein the aromatic hydroxy compound is an oil-soluble alkyl phenol.

7. The composition of claim 2 wherein the aromatic hydoxy compound is an alkyl naphthol.

8. The composition of claim 2 wherein the aromatic hydroxy compound is an octyl phenol.

9. The composition of claim 2 wherein the anti-oxidant is a naphthylamine.

10. The composition of claim 2 wherein the anti-oxidant is N-aryl substituted naphthylamine.

11. The composition of claim 2 which additionally contains a detergent quantity of calcium salt of oil-soluble petroleum sulfonic acid.

12. The composition of claim 2, wherein the anti-oxidant is phenyl alpha naphthylamine.

13. The composition of claim 2, wherein the anti-oxidant is dinaphthylamine.

14. The composition of claim 2, wherein the anti-oxidant is di-beta naphthylamine.

15. The composition of claim 2, wherein the anti-oxidant is 1,8-diamino naphthalene.

JOHN R. GRIFFIN, JR.
PAUL R. VAN ESS.

REFERENCES CITED

The following references are of record in the file of this patent:

UNITED STATES PATENTS

| Number | Name | Date |
|---|---|---|
| 2,121,748 | Suit | June 21, 1938 |
| 2,167,273 | Cook | July 25, 1939 |
| 2,308,502 | Farrington et al. | Jan. 19, 1943 |
| 2,375,222 | Griffin et al. | May 8, 1945 |